Figure 1:
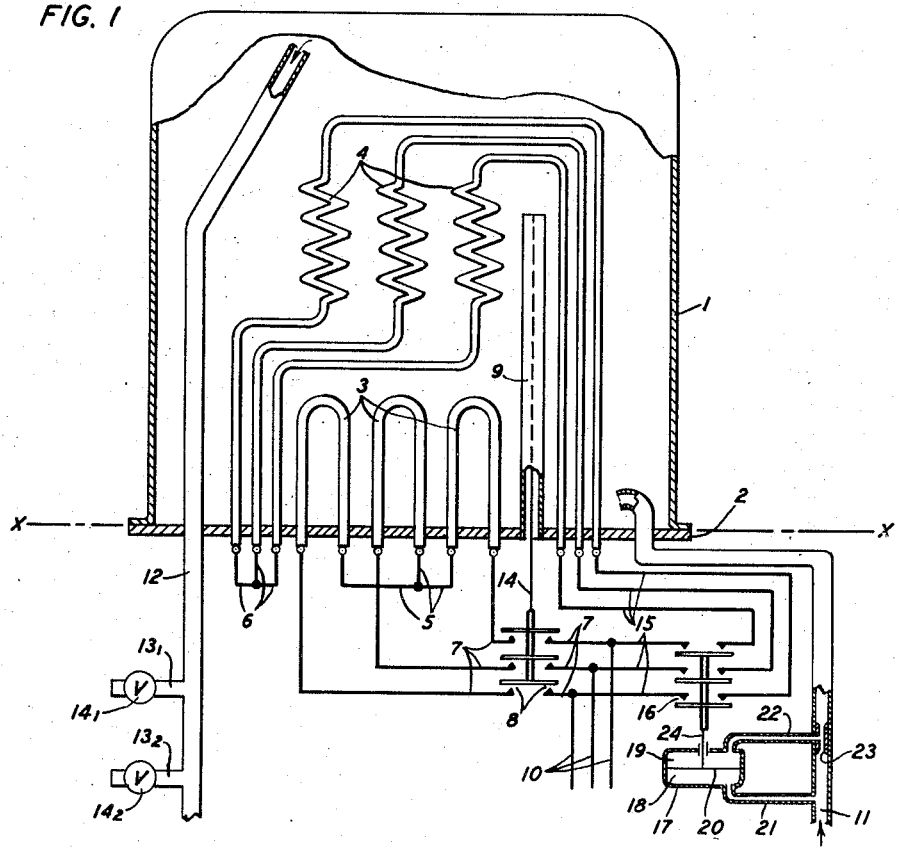

June 2, 1959

T. H. STIEBEL 2,889,444

ELECTRICALLY HEATED INSTANTANEOUS HOT
WATER GENERATOR AND STORAGE TANK

Filed Oct. 22, 1957

2 Sheets-Sheet 1

INVENTOR
THEODOR H. STIEBEL
BY

ATTORNEY

June 2, 1959

T. H. STIEBEL 2,889,444

ELECTRICALLY HEATED INSTANTANEOUS HOT
WATER GENERATOR AND STORAGE TANK

Filed Oct. 22, 1957

2 Sheets-Sheet 2

INVENTOR
THEODOR H. STIEBEL
BY

ATTORNEY

2,889,444

ELECTRICALLY HEATED INSTANTANEOUS HOT WATER GENERATOR AND STORAGE TANK

Theodor H. Stiebel, Holzminden, Weser, Germany

Application October 22, 1957, Serial No. 691,749

10 Claims. (Cl. 219—39)

The instant invention relates to a continuous flow hot water heater which is electrically heated, and more particularly to electrical instantaneous heaters having subdivided electrical heating means and a thermostat and a hydraulic pressure device controlling the energization and deenergization of the portions of the subdivided heating means.

An object of the invention is to provide an instananeous hot water heater or generator simultaneously serving as a hot water storage tank or reservoir, in which the electrical heating means is divided into two portions independently energizable and deenergizable, of which one portion is energized when any hot water demands, large or small, are made on the generator, and the other portion is energized only when the hot water demands exceed a predetermined amount.

Another object of the invention is to provide automatic control of the energization of electrically separate and independent heating elements of hot water heaters in accordance with two ranges in the rate at which hot water is drawn from the combined generator and storage tank.

Still another object of the invention is to provide a hot water generator which serves simultaneously as a reservoir for hot water of which the temperature is maintained at a predetermined temperature during periods when no hot water is drawn by less than the full capacity of the electrical heating means of the combined generator and storage tank.

The demands for hot water made upon instantaneous water heaters vary from relatively small amounts, usually drawn at a slow rate, for kitchen purposes, to large amounts, usually drawn at high speed, for baths, showers, wash tubs, washing machines, etc. The former which I shall hereinafter term "slow flow requirements," are relatively more frequent than the latter, which I hereinafter term "fast flow requirements," the quantity of the former is of the order from less than a quart to about five or six quarts total, of the latter of the order more than one gallon per minute continuously for any desired time, that is, requirements necessitating greater speeds of flow.

It is generally recognized for slow flow requirements a heating capacity of about 9 kilowatts is ample, while for fast flow requirements a heating capacity of from 18 to 21 kilowatts is required. However, so that the full heating capacity of 18 to 21 kilowatts will not be energized, and thus added to the load on the electrical distribution network, with the possibility of overloading the network not designed for the simultaneous use of the various electrical devices of the modern household with each drawing of hot water, the efforts of electrical manufacturers of such hot water generators are directed to providing as low as possible, what may be termed, a basic heating capacity of low kilowatt rating. This basic heating capacity, for example 9 kilowatts or less, would take care of the frequent slow flow requirements. To provide for the fewer fast flow requirements, an additional heating capacity of perhaps 9 to 12 kilowatts would be provided.

In prior known constructions, manually operable switches have been provided to permit the consumer of the hot water to switch on only a basic heater when confronted with a slow flow requirement, and additionally to switch on a supplemental or additional heater only when he has a fast flow requirement to meet. It was believed that in that way the chance of overloading the electrical supply network would be minimized. However, in practice, the users of hot water generators could not be interested in disconnecting the additional heating capacity for slow flow requirements since they, almost invariably, at all times desired to, and did, use the full heating capacity available, all the more so as the line network overload problem hardly concerns or troubles them.

In such type of instantaneous, continuous flow, hot water generators with manually presettable switches for insertion of the electrical heating means, control of the temperature of the outflowing hot water is usually by means of a hydraulic pressure switch and a thermostat. The function of the hydraulic pressure means is to connect the inserted heating capacity to the electric supply line immediately upon commencement of the hot water flow and to disconnect them immediately upon cessation of such flow. The hydraulic pressure means is adjusted so that it responds only to the marked changes in the static or dynamic hydraulic pressure occurring upon initiation, or termination, of the hot water flow and for this reason is installed either in the cold water inflow pipe or the hot water outflow pipe.

While such instantaneous heater, with thermostat and hydraulic pressure control means, of which control means the pressure means is the superior or predominant control means, has the advantage that the heating means is promptly energized and deenergized with the start and stop, respectively, of the drawing of hot water, such generator cannot also function as a reservoir for hot water in which, as is well known, heating and holding the water within the reservoir at a predetermined temperature takes place during the periods when no hot water is drawn therefrom.

Where the instantaneous hot water generator is controlled solely thermally, by the heat of the water within the generator, there is a time lag between the energization of the electrical heating means and the initiation of the hot water flow, as also in the deenergization thereof when the drawing of hot water is stopped. The cold water flowing into the generator on starting to draw water therefrom cannot immediately or quickly enough influence the thermostat to connect the electric line, and with the electric heating means energized and the drawing of hot water stopped, the heated water still within the generator must all be heated to the predetermined temperature before the thermostat responds to disconnect the electric line from the heating means. Even when the thermostat has responded to disconnect the electric line, the residual heat in the electrical heating means dissipates into the water within the generator to heat it still further. While such delayed response is somewhat of a disadvantage at the higher heating capacity wattages, it must be noted that when really small quantities of hot water are drawn, it may work as an advantage where all the water required at the time has been drawn before the thermostat can respond to the decreased water temperature within the generator caused by the inflow of an equally small amount of replacing cold water. Thus, the heating means would not be connected to the electric line for such withdrawals of small amounts of hot water in short intervals, being so connected only at longer time intervals when the generator contents may have cooled to the predetermined low temperature.

My instant invention is thus directed to providing a purposeful division of the electric heating means so that, without any manual intervention, the energization and deenergization of the heating means portions is controlled solely by the hot water demands made upon the generator from time to time. I accomplish this by providing a two-portion heating means, a basic heating means preferably of low heating capacity and controlled solely by a thermostat, and a supplemental heating means, of a capacity at least equal to that of the basic heater but preferably larger, controlled solely by hydraulic pressure means and independent of the thermostat. The supplemental or additional heater is energized solely during the interval when fast flow requirements must be met by the generator and entirely automatically by the commencement of such fast flow requirements. The instantaneous heater of this invention thus has the advantage of requiring more electrical power only for the intervals when fast flow requirements are being met, which intervals are normally considerably less frequent than intervals of slow flow requirements, and at the same time the generator serves as a hot water storage tank or reservoir, holding hot water in readiness by the action of the thermally controlled basic heater. Since the taps from which normally a slow flow requirement is to be met, are different from the taps normally called upon to meet fast flow requirements, I provide my hot water combined generator and reservoir with separate hot water outflow pipes, or a branched hot water outflow pipe, corresponding to the respective requirements, inserting the hydraulic pressure control means preferably in the outflow pipe or branch for the fast flow requirements, although it may be positioned in the cold water inflow pipe. The hydraulic pressure control means may be of any of the prior known types, such as those in which the hydraulic pressure displaces a piston, a wheel, a valve, or a differential pressure type, of which the movement of the movable element is communicated to a member having contacts in the circuit of the additional heater, the movable member being actuated immediately upon the occurrence of the marked static or dynamic pressure change, in excess of a predetermined minimum, occurring when water flow commences or stops in the hot water pipe or branch for meeting fast flow requirements. Admittedly, such pressure control means will operate each time a tap is opened in such fast flow requirement hot water pipe or branch, and operate independently of the actual velocity of the water flowing therethrough above a predetermined minimum, which preferably is about one gallon per minute. While hot water may be drawn at a high velocity from a fully opened tap on the hot water pipe or branch for slow speed requirements, the hydraulic pressure control means will not be operated and the additional heating means will remain deenergized, with the result that the water drawn at high velocity from such slow speed requirements tap will generally not be of the desired temperature for any appreciable length of time. Since the temperature of hot water drawn from the slow speed requirements taps is normally more important than the speed at which such hot water is drawn, I preferably provide a choke in the slow speed requirements branch or pipe so that a predetermined speed, at which for an appreciable time (until the stored hot water has been wholly withdrawn) the water drawn is not below the desired temperature, of hot water outflow will not be exceeded. The appreciable time for which the drawn water is not below the desired temperature it will be noted is due to the fact that the presence of the choke causes the inflow of cold water to be slower and of a velocity which mixes it less and more slowly with the stored hot water. Hence, as stated, the temperature of the outflow is maintained substantially until all the stored hot water is withdrawn. It will be noted that with prior art electrically heated instant heaters controlled by hydraulic pressure means without a thermostat, when water is tapped the initial flow is of cold water and continues cold until the heating coil, energized by the tapping, heats up; whereas with the combined generator-reservoir of my instant invention the initial flow on tapping is hot even though the heating coil has not heated up. Hence, with my invention the outflow temperature is maintained, by the smooth transition from the storage function of my combined generator-reservoir to its generator function. It will be noted that since the basic heating means is controlled solely by the thermostat, the water remaining within the reservoir of my heater which may have cooled over a period during which no hot water is drawn therefrom, is immediately reheated upon dropping to a predetermined lower temperature, and the water contained in the generator-storage tank having been reheated by the energization of the basic heating means to a predetermined higher temperature, the thermostat actuated to disconnect the basic heating means from the electric line supply.

In a modified embodiment of the hot water generator-reservoir of my invention, particularly where the slow flow requirements can be met by a small reservoir of a water capacity of the order of five to eight quarts, I have found that the hot water generator need have a basic heating means of the order of but 2 kilowatts. Since the fast flow requirements, as has been stated, require some 20 to 21 kilowatts of heating capacity, I provide an additional heating means of some 18 kilowatts capacity and as thermal control of only such basic heating capacity of 2 kilowatts would be totally inadequate to maintain a desirable hot water temperature, in this embodiment both the basic and additional heating means are thermally controlled, the fast flow requirements being also controlled by the hydraulic pressure means, as before. In this modified embodiment, even though the hydraulic pressure control means is in series with the thermostat, heating to meet fast flow requirements occurs only when a perceptible and predetermined temperature drop has taken place in the generator contained water. That is, unless there has been a substantial temperature drop in the container contents due to drawing a substantial percentage of its contents suddenly to meet a fast flow requirement, the more powerful additional heating means will not be energized and perhaps result in the overheating of the residual hot water still in the generator after a period when no, or but little, hot water is drawn to meet either a fast flow or a slow flow requirement. The feasibility of having thermal control of the additional heating means in this modified embodiment of my instant invention will appear from the following consideration. Assuming that, as above stated, the differential hydraulic pressure control means responds at a minimum velocity of one gallon per minute, with a heating capacity of 18 kw. and water inflow temperature of 17° C., the outflow temperature rises to 98° C., a temperature near the boiling point. At this temperature there is not only some generation of steam and the attendant danger of scalding, but the outflow is no longer continuous, the water spits and sprays and eventually but a flow of steam may be emitted. To prevent such occurrence, the thermal control of the additional heating means is set to disconnect at about 80° C. Thus, for a fast flow requirement of short duration, which does not draw in excess of about one-third of the generator contents, even though the hydraulic pressure control means is actuated, the additional heating means is not energized because the temperature drop of the residual generator contents is insufficient to actuate the thermostat to its line connecting position. As a result, the electric line is connected to the powerful additional heating means only when necessary.

Generalizing, the additional heating means should be of such magnitude that hot water can be drawn continuously for fast flow requirements, while the basic heating means is of only such magnitude that hot water can be drawn from the storage tank only in what may be termed a "storage operation" but can be of such magnitude that a small quantity of hot water, for example one quart a minute, can be drawn continuously in what may be termed a "storage and continuous operation." For the former mode of operation the 2 kilowatt basic heating means suffices, while for the latter mode of operation the basic heating means is the 9 kilowatt embodiment (in each instance with the required magnitude for the additional heating means to make the total heating capacity at least 18 kilowatts).

Both embodiments of my invention have a particular advantage when the line current is interrupted for any cause whatever, in that the starting load placed on the line when service is restored is kept at a minimum. On failure of the line current for all but momentary interruptions, the chances are that the water content of all the instantaneous hot water generators of my invention has cooled sufficiently to thermally connect the basic heating means only to the line. That is an 8 kilowatt heating means in the embodiment, and a 2 kilowatt heating means in the modified embodiment, thus resulting in a low starting load.

Figure 2:
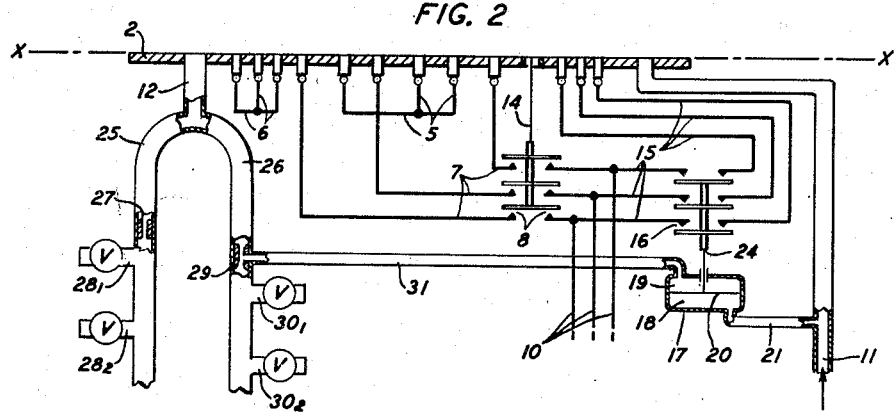
Figure 3:
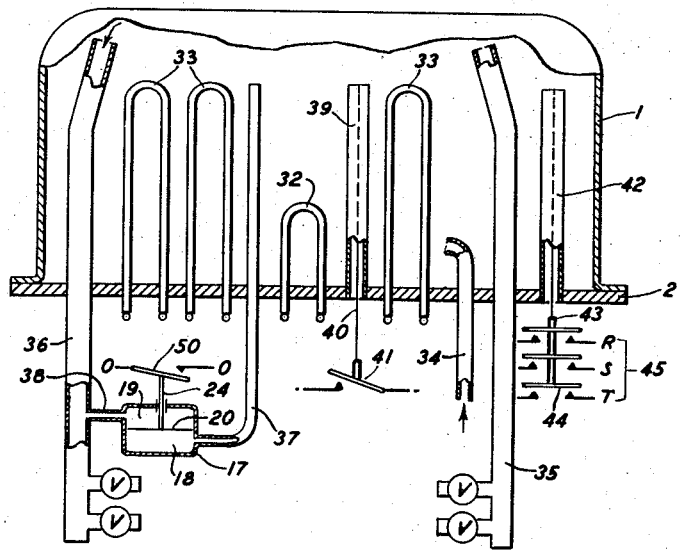
Figure 4:
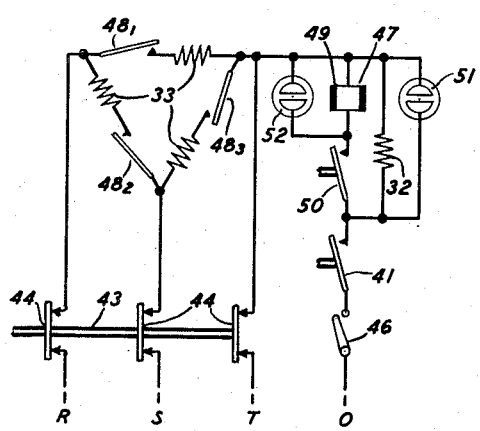
Figure 5:
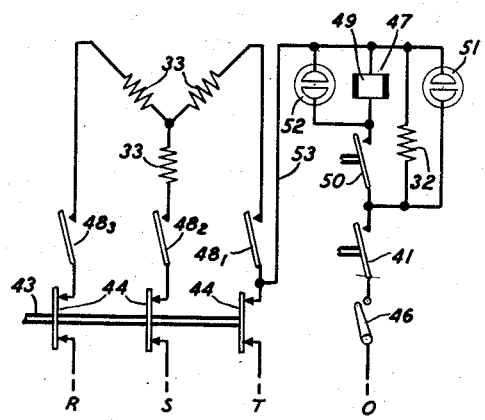

The foregoing, and other, objects and features of my invention will more readily be understood from the following detailed description of illustrative embodiments thereof, in conjunction with the accompanying drawing, in which:

Figure 1 is an elevational section, highly simplified, of a first illustrative embodiment of the instantaneous hot water generator of my invention with the hydraulic pressure control means in the cold water inlet pipe, and including the electrical circuit schematic;

Figure 2 is the electric circuit schematic of a second illustrative embodiment of which the elements within the hot water generator are the same as the corresponding elements of the embodiment of Figure 1 but the external portion of the hot water outlet pipe is branched and the hydraulic pressure control means is in the fast flow requirements branch and a choke is in the slow flow requirements branch;

Figure 3 is an elevational section and circuit schematic, like Figure 1, of a third embodiment of my instantaneous hot water generator with separate hot water outlet pipes, the hydraulic pressure control means being positioned in the fast flow requirements outlet pipe; and Figures 4 and 5 are electric circuit schematics for the heating and control means of the third embodiment with the heating means Δ-connected and Y-connected respectively.

Referring to Figure 1, the instantaneous, continuous flow hot water generator consists of a closed container 1 sealed by a flanged bottom 2 in which two arrays of heating elements, 3 and 4, are supported. Each array of like heating elements 3 and 4 is connected to a Δ or Y by conductors 5 and 6 respectively. The lead-ins 7 for the heater array 3 are bridgeable by contacts 8 supported on the externally projecting portion of the bimetal thermostat 9, which contacts 8 close down to connect the lead-ins 7 to the electric line supply 10 when the thermostat 9 has cooled down to a predetermined temperature. A water inlet pipe 11, connected to the water mains (not shown) opens into the interior of the container 1 near the bottom thereof, while a hot water outflow pipe 12 from the top interior region of the container is connected externally of the container 1 to a plurality of individual hot water lines $13_1$, $13_2$, . . . normally closed by valves $14_1$, $14_2$, . . . . With the bridging of lines 7 by contacts 8, heating elements 3 are energized, heating up and heating the water content of container 1. Thermostat 9 is of such construction, for example, that its externally extending member 14, on which contact bridges 8 are supported, is drawn inwardly sufficiently when the container water content is heated to a predetermined higher temperature, to disengage bridging contacts 8 from line 7, thus disconnecting the heating array 3 from the line supply leads 10.

The heater array 4 is connected by lead-in conductors 15 to line supply leads 10 by way of bridging contacts 16 actuatable by the hydraulic pressure means 17, known per se. While, as has been stated, the hydraulic pressure means controlling the operation of contacts 16 in connecting and disconnecting leads 15 from the line 10 may be of any type, I have shown it in the form of a differential pressure gage, consisting of two chambers 18 and 19, separated by a flexible membrane 20. Chamber 18 is connected by means of a pressure transmitting channel 21 to the cold water inlet pipe 11, the channel transmitting the static pressure portion of the total pressure prevailing in the inlet pipe on a flow of water, to chamber 18. Another pressure transmitting tube 22 connects chamber 19 to a Venturi tube constriction 23 in the inlet pipe 11, at which the static portion is decreased in inverse proportion to the increasing dynamic portion at that point of the total pressure. The greater the velocity of the water in inlet pipe 11, the greater the pressure difference between chambers 18 and 19. The differential pressure acting on membrane 20 deflects it, the movement of the membrane being imparted by way of a transmission member 24 to the bridging contacts 16. The hydraulic pressure means 17 is so connected that with increasing water velocities the membrane 20 is moved in the direction to close bridging contacts 16 to connect the additional heating array 4 to the electric line supply 10. When the water velocity is less than a predetermined minimum, and hot water is drawn, the basic heater array 3 is energized by the actuation of thermostat 9, while when the predetermined minimum velocity of the water is reached, the additional heater array 4 is energized by hydraulic pressure means 17 to remain so energized until the velocity subsequently falls to below the predetermined minimum, when the additional heater 4 is disconnected.

Where, as here, both the high pressure channel 21 and the low pressure channel 22 are connected to the same water pipe, a choke, preferably hand controlled, may be substituted for the Venturi termination 23, the high pressure channel being connected upstream of such choke and the low pressure downstream thereof. Such manually controlled choke provides a convenient mode of controlling the minimum water volume per minute at which the differential pressure means is actuated to close the electrical circuit of the additional heating array.

Irrespective of whether only the basic heater 3 or both heaters 3 and 4 have just been energized, the maintenance of the temperature of the water contents of container 1 is by the thermally controlled basic heater 3 only, that is, by but a part of the total heating capacity of the hot water generator. In that the thermostat 6 is independent of the hydraulic pressure means 7, the former takes over to control the basic heater 3 for regulating the temperature of the water in the container during intervals when no water is drawn from the combined generator and storage tank.

In Figure 2, showing a second embodiment, only those elements external to the hot water container 1, necessary for understanding this embodiment, are shown, the internal parts of the combined generator and storage tank being, for example, identical to those of Figure 1. Like reference characters in the figures indicate like elements in the embodiments. In the second embodiment, the hot water outlet pipe 12 is divided into two branches 25 and 26 of which branch 25 is for meeting slow flow requirements and branch 26 for meeting fast flow requirements. In branch 25 a choke 27 is provided, and positioned in advance, in the direction of water flow, of any of the slow flow requirement taps $28_1$, $28_2$, ..., to keep the velocity of flow in such branch at not in excess of a predetermined maximum, and the outflowing hot water at substantially the desired temperature at all times. The second embodiment differs from the first embodiment in that, instead of being in water inlet pipe 11, a Venturi constriction 29 is positioned in branch 26 in advance of the fast flow requirement taps $30_1$, $30_2$, ..., which constriction 29 is connected by the pressure transmission tube 31 to chamber 19 of hydraulic pressure means 17. Thus, only when a fast flow requirement tap $30_1$, $30_2$, ..., is opened is the hydraulic pressure means actuated to connect the auxiliary heater 4 to the electric line 10 by way of member 24.

In the third embodiment of the hot water generator of my invention, shown in an elevational simplified view in Figure 3 with alternative electric circuit connections thereof shown in Figures 4 and 5, the basic heater 32 of about 2 kilowatt capacity, and the additional heater array 33 of about 18 kilowatt capacity are likewise supported on the bottom wall 2 of a closed container 1, with the cold water inlet pipe 34 opening into the lower interior of the container, and the hot water outlet pipes 35 and 36 extending into the upper portion of the container interior. Outlet pipe 35 is the pipe from which slow flow requirements are met, and outlet pipe 36 that from which the fast flow requirements are serviced. The chamber 18 of the hydraulic pressure means 17 is connected by the high pressure transmission passage 37 to the upper interior region of container 1, while chamber 19 of the hydraulic pressure means is connected by the low pressure transmission channel 38 to the fast flow requirements outlet pipe 36, in advance of the first tapping point on pipe 36. The low pressure line 38 does not terminate in a Venturi constriction within fast flow requirement outlet pipe 36 since the velocity of water in container 1 and the velocity of water in the fast flow requirement outlet pipe 36 differ markedly from each other due to the relative cross-sections of container and pipe, perhaps a 100:1 ratio. A thermostat 39 positioned within the container has a central member 40 extending externally of container 1 and is so actuated thermally by the water content of the container that with the water content at or below a predetermined temperature it extends furthest from the container. The outer end of member 40 is connected to the movable contact of switch 41 to connect the basic heater 32 to the line supply. A temperature limiting or safety switch 42 has a central member 43 extending externally of the container 1 and carries a plurality of bridging members 44, at its outer end which normally close the lines R, S and T respectively, of a three-phase four-wire line supply 45, the fourth line O of which is connected by way of manually operable switch 46 to switch 41 controlled by thermostat 39 to close the movable contact thereof upon its fixed contact when the water content of container 1 has cooled down to a predetermined temperature. Temperature limiting or safety switch 42 is adjusted to a temperature sufficiently elevated beyond the cut-off response of thermostat 39, which, for example, is 80° C., so that it responds only in case of danger. For example, safety switch 42 responds to a temperature of about 110° C. In cases where the instant continuous flow heater is connected to low pressure cold water mains, in which 100° C. only can be attained, because the container in such case is vented to the external atmosphere, the safety switch 42 response is adjusted to 100° C. Hence, only in cases of danger is safety switch 42 actuated, for example, on a failure of thermostat 39 and the boiling away of the water in the container, that is, when the heating elements run dry. The basic heating coil 32 is connected between the fixed contact of thermally controlled switch 41 and line T of the four-wire line supply 45 so that it will be energized if serially connected switch 41 and 46 are both closed.

Manual switch 46 is provided so that the line supply current may be turned off at any time by the user of the generator-reservoir.

The details of the electrical circuit of the embodiment of Figure 3, which may take several specific forms, are shown in their entirety for two illustrative alternatives in Figures 4 and 5, the supplemental heating coils being Δ-connected in Figure 4 and Y-connected in Figure 5. In both of the alternative electrical circuit diagrams a contact actuating device 47, having three movable contacts $48_1$, $48_2$, $48_3$ and a coil 49, has its coil 49 serially connected to switch 50, of which the movable arm is connected to and actuated by movable member 24 of the hydraulic pressure control means 17, coil 49 and switch 50 being shunted across basic heater 32. A glow lamp 51 shunted across basic heater 32 will thus light up when the basic heater is energized, while a glow lamp 52 in shunt of coil 49 will light up when the additional heaters 33 are energized.

In the Δ-connection of Figure 4, the contacts $48_1$, $48_2$ and $48_3$ are serially connected to the individual additional heater elements 33 within the Δ-connection of such heaters, so that the one line supply wire T at all times, when bridges 44, controlled by temperature limiter or safety switch 42, are in the line closing position, the basic heating coil is connected to the line T, and the common return line O by way of switch 41 controlled by thermostat 39.

In the Y-connection of Figure 5, in which the contacts $48_1$, $48_2$ and $48_3$ are serially connected in each of supply leads R, S and T, an individual connection 53 connects the other side of heater 32 to a point in supply line T beyond contact $48_1$, so that the energizing circuit for the basic heater is line T, bridge 44, connection 53, heater 32, switch 41, switch 46, supply return lead O. It will be obvious too, that if the Y-connection were to include the contacts $48_1$, $48_2$ and $48_3$ in series with the individual additional heating elements 33 within the Y-connection itself, the connection 53 would not be required to complete the circuit through basic heater 32, as is the case with the Δ-connection of Figure 4.

The operation of my combined generator and storage structure of Figure 3, provided with either of the circuits of Figures 4 and 5, is relatively obvious. Assuming, as above, the temperature of the cold water supply mains is of the order of 17° C., thermostat 39 would not respond, being set for 80° C. Having closed manually operable switch 46, switch 41 in response to the water temperature within container 1, will close the circuit through basic heater 32 since the bridge 44 in line T is normally closed. The bridges 44 being also closed in lines R and S, the circuit through the basic heater is entirely closed and the basic heater will be energized and lamp 51 light up. Coil 49 remains unenergized, however, in that switch 50 in series therewith remains open. Hence, contacts $48_1$, $48_2$ and $48_3$ likewise remain open and the additional heaters 33 are not energized. Just as soon as a quick flow requirement tap on outflow pipe 36 is opened and the velocity of the drawn water exceeds more than one gallon per minute, as stated, the pressure control means 17 closes switch 50, energizing coil 49 and closing contacts $48_1$, $48_2$ and $48_3$. The additional heater elements 33 are thus energized and lamp 52 lights up. This state continues until the water in container 1 reaches the predetermined temperature of 80° C. to which the thermostat 39 is set, at which predetermined temperature thermostat 39 opens switch 41 thereby deenergizing all the heating coils. If for some reason or other, either thermostat 39 does not operate to open switch 41 at such predetermined temperature, the safety switch 42, adjusted to open lines R, S and T at a temperature higher than such predetermined temperature, as stated 110° for pressure water lines and 100° for gravity or low pressure water lines, will ultimately open lines R, S and T, thus deenergizing all the heaters. It is also to be noted that as the result of setting the pressure responsive means 17 to a minimum velocity of one gallon per minute, not every tapping of the high flow requirement outflow pipe 36 will result in energizing the additional heaters 33.

Various modifications of the automatic instantaneous heater-reservoir of my instant invention will suggest themselves to workers in the art, and it is understood that the embodiments I have described are solely by way of illustration and not by way of limitation. In particular, I do not limit myself to the three-phase four-wire interconnections; any other system can be the basis thereof.

What I claim is:

1. An electrical instantaneous water heater and storage tank comprising a container, a water inlet passage into the container, at least one water outlet passage out of the container, a basic first electrical heating element cooperating with the container interior to heat the water therein contained, an additional second electrical heating element similarly cooperating with the container interior, a thermostatic element controlled by the temperature of water within the tank, first switching means controlled by the thermostat element adapted to connect an electrical line supply to the basic heating element when the temperature of the water in the container falls to a predetermined low temperature, and to disconnect the line supply to the basic heating element when the temperature of the water within the container reaches a predetermined high temperature, a hydraulic pressure sensitive device connected to at least one of the passages, and second switching means controlled by the pressure sensitive device and adapted to connect the electrical line supply to the additional second heating element when the flow through the passages is at least of a predetermined minimum velocity and to disconnect the line supply from the second heating element when such flow is below the predetermined minimum velocity.

2. An electrical instantaneous water heater and storage tank according to claim 1 having one outflow passage in which the portion of the outflow passage external to the container is branched into a first slow flow requirement branch and into a second high flow requirement branch, the hydraulic pressure sensitive device is of the differential pressure type of which the high pressure side is connected to the inlet passage and the low pressure side is connected to the second high flow requirement branch of the outlet passage.

3. An electrical instantaneous heater and storage tank according to claim 1 in which the hydraulic pressure sensitive device is of the pressure differential type and the predetermined minimum velocity to which it responds is at least one gallon per minute.

4. An electrical instantaneous heater and storage tank according to claim 1 in which the hydraulic pressure sensitive device is of the pressure differential type having its high pressure side connected to the inlet passage and having its low pressure side connected to the inlet passage at a region of restricted cross-sectional area of the inlet passage.

5. An electrical instantaneous heater and storage tank according to claim 1 having one outflow branch in which the portion of the outflow passage external to the container is branched into a first slow flow requirement branch and into a second high flow requirement branch, and a choke is within the first slow flow requirement branch to limit the velocity of water flowing therein.

6. An electrical instantaneous heater and storage tank according to claim 1 having two outflow passages of which a first is for slow flow requirements and the second for fast flow requirements in which the hydraulic pressure sensitive device is of the pressure differential type of which the high pressure side is connected to the interior of the container below the level of the opening of the second outflow passage and the low pressure side is connected to the second outflow passage at a portion thereof external to the container.

7. An electrical instantaneous water heater and storage tank comprising a container, a water inlet passage into the container, a first water outlet passage from the container for slow flow requirements, a second water outlet passage from the container for fast flow requirements, a basic first heating element with the container interior to heat the water therein, an additional second heating element similarly cooperating with the continer interior, a first thermally responsive device controlled by the temperature of the water within the container, first switching means controlled by the first thermally responsive device adapted to connect a source of electrical energy to the basic heating element when the temperature of the water within the container falls to a predetermined low temperature and to disconnect such source from such heating element when the temperature of such water reaches a first predetermined high temperature, a second thermally responsive device controlled by the temperature of the water within the container, second switching means controlled by the second thermally responsive device, a hydraulic pressure sensitive device of the pressure differential type having its high pressure side connected to the water within the container and having its low pressure side connected to the second water outlet, and third switching means controlled by the pressure sensitive device to close when the flow in the second passage is at least a predetermined minimum, and to open when the flow is below the predetermined minimum, the second and third switching means being serially connected to the additional second heating means so that on closure of both the additional heating means is connected to the source of electrical energy, the second thermally responsive device normally maintaining closed the second switching means at all temperatures of the water within the container below a second predetermined high temperature, the second predetermined temperature being higher than the first predetermined temperature, and opening the second switching means when the temperature within the container reaches the second predetermined high temperature, and remaining open irrespective of the temperature within the container thereafter until manually reclosed.

8. An electrical instantaneous heater and tank according to claim 7 in which the basic heating element has a heating power which is a fraction of that of the additional heating element.

9. An electrical instantaneous heater and tank according to claim 7 in which the basic heating element has a heating power of about 2 kilowatts and the additional heating element has a heating power of about 18 kilowatts.

10. An electrical instantaneous heater and tank according to claim 7 in which the third switching means is serially connected to the coil of a contact operating device, the third switching means and coil being in shunt of the basic heating element, and a plurality of movable contacts of the contact operating device are operable to simultaneous closure on energization of the coil, each of the plurality of movable contacts being serially connected to a portion of the additional heating element and leads from the source of electrical energy.

References Cited in the file of this patent
UNITED STATES PATENTS

| | | |
|---|---|---|
| 1,555,338 | Vaughan | Sept. 29, 1925 |
| 1,920,284 | Wells | Aug. 1, 1933 |
| 2,242,362 | Marbury | May 20, 1941 |